Dec. 15, 1936.  S. COHEN  2,063,986

VARIABLE CONDENSER AND TRIMMER THEREFOR

Filed May 8, 1934

INVENTOR
Samuel Cohen
BY
James & Franklin
ATTORNEY

Patented Dec. 15, 1936

2,063,986

UNITED STATES PATENT OFFICE 2,063,986

VARIABLE CONDENSER AND TRIMMER THEREFOR

Samuel Cohen, Brooklyn, N. Y., assignor to General Instrument Corporation, New York, N. Y., a corporation of New York Application May 8, 1934, Serial No. 724,491

13 Claims. (Cl. 175—41.5)

This invention relates to variable condensers, more particularly to condensers provided with trimmers, and especially condensers of the multiple or gang type.

In variable condensers of the multiple or gang type, it is customary to provide trimmer condensers at each of the sections for adjusting the minimum capacitances of the sections. These trimmer condensers ordinarily comprise a single plate one end of which is stationarily mounted, and the other end of which is movable with respect to the condenser frame for capacitance variation. The stationary end of the trimmer plate is secured to the frame or/and the stator comb by the same mounting screws which fasten the stator to the frame. The location of the trimmer condenser at either side of the frame is determined at the factory, and it is not feasible for the user to shift the trimmer from one side to the other because the stator must be very accurately positioned when mounted in the frame, and such accurate position or adjustment is lost when the mounting screws are released to move the trimmer to the other side of the condenser. The use of separate or independent mounting screws has therefore been suggested.

The object of my invention resides, generally, in the provision of improved mutually independent mounting means for the stator and trimmer, preferably including means on the stator combs receiving and mating with means on the trimmer plate. Other objects of my invention center about the provision of suitable soldering lugs for the stator. In some cases it may be convenient to wire a connection to the trimmer side of the condenser and in other cases to the opposite side of the condenser. In accordance with one object and feature of my invention, I provide a detachable soldering lug adapted to be connected to the stator at the side of the condenser opposite the trimmer, said lug utilizing the means anyway provided on the stator to receive the trimmer plate. It is also customary to add a soldering lug to the trimmer plate, and while such a lug does not itself use much metal, it results in substantial scrap or waste metal in the sheet from which the trimmer plates are punched. In accordance with a further object and feature of my invention, a soldering lug is so formed and located on the trimmer plate that no extra metal is required.

To the accomplishment of the foregoing and other objects which will hereinafter appear, my invention consists in the condenser elements and their relation one to the other, as hereinafter are more particularly described in the specification and sought to be defined in the claims. The specification is accompanied by a drawing, in which:

Figure 1:
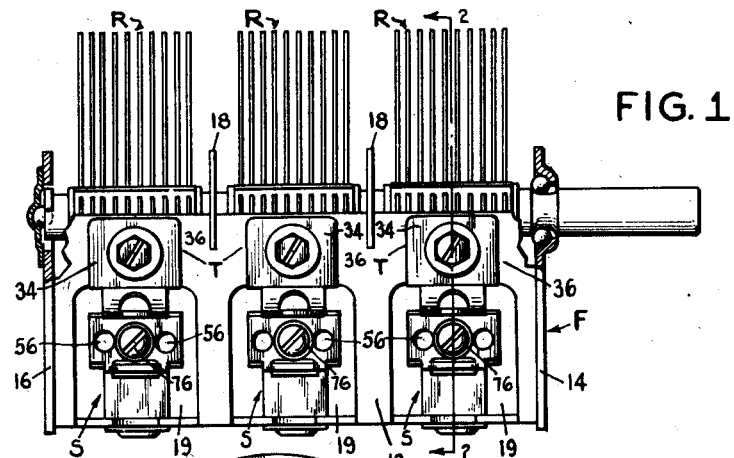
Fig. 1 is a side elevation of a condenser embodying features of my invention.
Figure 2:
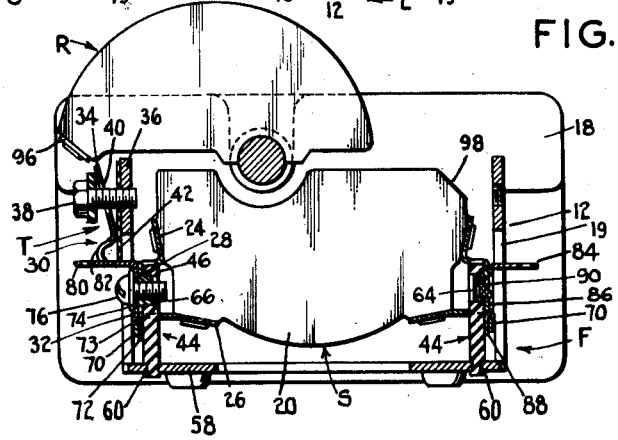
Fig. 2 is a section taken in the plane of the line 2—2 thereof.

Referring to the drawing and more particularly to Figs. 1 and 2 thereof, the condenser there shown comprises a frame F carrying rotor sections R adapted to interleave with stator sections S, and trimmers T for adjusting the minimum circuit capacitance of the sections. The frame F comprises a U-shaped or trough-like element 12 and end plates 14 and 16 locked thereto by appropriate riveted tongue and slot connections. The frame further includes transverse shields or partitions 18 which divide the same into pockets each receiving one of the condenser sections. The side walls of the condenser are cut away at 19 to expose the stator and trimmer condenser mountings.

Figures 3, 4, 5, 6, 7:
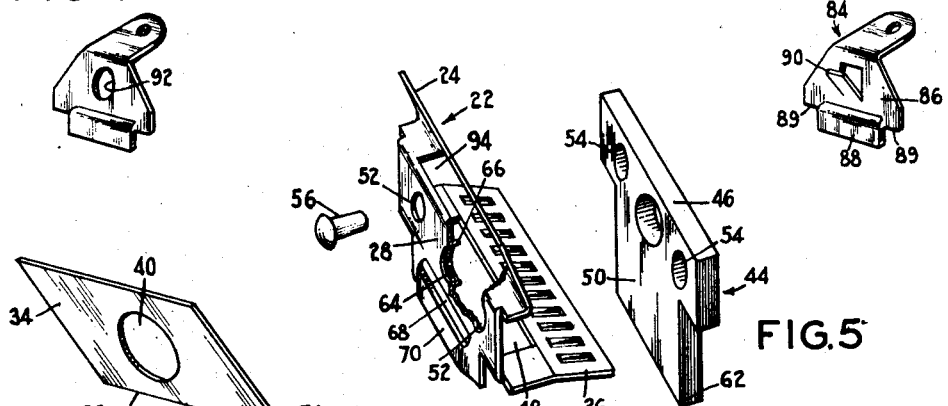
Fig. 3 is a perspective view of a trimmer plate constructed in accordance with my invention.
Fig. 4 shows a spacer or comb embodying features of my invention.
Fig. 5 illustrates an insulation support suitable for use with my invention.
Fig. 6 shows a soldering lug constructed in accordance with a further feature of my invention.
Fig. 7 is a similar view of a modification.

The stator S comprises a plurality of similarly shaped plates 20 arranged in spaced parallel relation and connected at their edges by spacer and support members 22, best shown in Fig. 4. For convenience these members may be referred to as combs, although I believe that term originated with spacer members having teeth or open slots rather than the closed slots here illustrated and preferred. Each comb includes an upper strap 24, a lower strap 26, and an outwardly bent channel-shaped connecting portion 28. The straps 24 and 26 extend in parallel directions but lie in angularly related planes, the lower strap 26 preferably coming somewhat beneath the stator plates, thus resulting in a sturdy stator assembly. The plates are secured to the straps by appropriate staked tongue and slot connections of conventional type.

The trimmer condensers T comprise a single plate 30 the lower end 32 of which is stationary and tightly secured to the stator S, and the upper end 34 of which is movable toward and from the adjacent part 36 of the condenser frame for capacitance variation. The adjustment may be made by an adjusting screw 38 passing through an over-size hole 40 in the trimmer plate and threaded into the frame part 36. A thin wafer 42 of a suitable insulation, such as mica, may be inserted between the plates of the trimmer condenser.

It has heretofore been the practice to hold the stationary part 32 of the trimmer plate in position by means of screws which are also used to lock the stator combs 22 to the frame F through intermediate pieces of insulation. In accordance with the present invention, the stator section is mounted in the frame by means wholly independent of the trimmer condenser, and rapid removal of the trimmer condenser, or transfer of the same from one side to the other of the condenser frame, is greatly facilitated. The stator is mounted in the frame by means of insulation blocks 44, best shown in Fig. 5. The blocks are generally T-shaped, and the top or cross bar 46 of the block is dimensioned to be received within the channel 28 of the comb. The bottom of channel 28 is cut away or slotted, as shown at 48, to receive the stem 50 of insulation block 44. The comb and block are provided with aligned apertures 52 and 54 respectively, through which the comb and block are permanently locked together by appropriate rivets 56. It will be understood that the block and comb are preferably thus assembled before applying the comb to the edges of the stator plates.

The bottom wall 58 of the condenser frame is slotted at 60 to receive the lower ends 62 of the insulation blocks. The stator is lowered in place in the frame and accurately located by an appropriate fixture whereupon the outer edges of the bottom wall 58 of the condenser frame may be forced inwardly against the blocks 44 with sufficient pressure to bite into the blocks and thus lock the same securely and permanently in place, as is best shown in Fig. 2.

Referring to Figs. 2 and 4, the sheet metal comb 22 is provided with a threaded opening 64. The metal is preferably preliminarily extruded inwardly, as shown at 66, in order to provide increased thread surface while using light gauge metal. The comb is further provided with a slot 68 formed by striking a lip 70 outwardly from the bottom of channel 28.

The trimmer plate 30 is provided with appropriate means mating with the said parts of the comb. Specifically, the lower end of the stationary part 32 of the trimmer plate is formed into a tongue 72 dimensioned and shaped to pass within the lip 70 until stopped by marginal shoulders 71. The tongue 72 may, if desired, be bent, as is indicated at 73, to provide a snug fit between the tongue and the comb strap 70 receiving the same. The stationary portion 32 is apertured at 74 in alignment with the threaded hole 64 of the comb. The trimmer plate is also apertured at 75 with large holes clearing the ends of the rivets 56. The trimmer plate may thus be mounted in place with the aid of only a single screw, this screw being indicated at 76 in Figs. 1 and 2. To transfer the trimmer condenser from one side of the frame to the other, it is simply necessary to release adjusting screw 38 and the single mounting screw 76, and to thereupon shift the trimmer plate upwardly out of slot 68. The parts are then placed on the opposite side of the condenser in similar relation, the sides of the condenser frame being made symmetrical for this purpose.

It is customary to provide the trimmer plate with a soldering lug formed integrally therewith and ordinarily projecting from the bottom end thereof, thus affording convenient connection to the stator. While the lug itself requires but little metal, it has heretofore caused considerable scrap or waste of metal. In accordance with a further feature of my invention, a soldering lug is provided which is struck outwardly from the middle of the trimmer plate, thus entirely eliminating waste of metal. Specifically, I form a soldering lug 80 which is struck outwardly from the trimmer plate and is connected thereto at the top of the stationary portion 32. The stationary and movable portions of the trimmer plate are joined by an outwardly bent or channeled part 82 which accommodates free movement of the upper part of the plate relative to the lower part of the plate. The lug 80 may be struck from this part of the plate during the formation of the plate, and I find that a suitable lug may be provided without cutting metal from the movable or effective condenser part 34 of the trimmer plate.

To permit connection to be made to the stator on the side of the condenser opposite the trimmer, I provide additional soldering lugs 84, best shown in Figs. 2 and 6. Each lug 84 is formed integrally with and bent outwardly from a body member 86. The lower end of body 86 is formed much like the lower end of the trimmer plate, it being provided with a tongue 88 adapted to fit snugly within the slot 68 or lip 70. To complete the mounting of the lug on the comb, the body 86 may be apertured to receive a mounting screw like the screw 76 used with the trimmer plate. If desired, the construction may be further cheapened by striking a tab 90 inwardly from body 86 and dispensing with the mounting screw. The tab 90 is opposed to tongue 88 and jams within the threaded hole 64 of the comb 22. It will be understood that the complete lug may be forced in place or removed, as desired, and that when pressed home it is held securely by the upward pressure of the tab 90 and the downward pressure of the shoulders 89 at each side of the tongue 88.

Of course, a screw like screw 76 of the trimmer plate may be used to hold the soldering lug in place. In such case the lug is made as shown in Fig. 7, the body of the lug being perforated at 92 to receive the screw.

In addition to the slot 48 (Fig. 4) adjacent the lower strap 26 of the comb 22, I may provide an additional slot 94 adjacent the upper strap 24. These slots are of advantage in affording a very slight yieldability of the straps for self-adjustment during assembly of the condenser.

The large radius ends of the rotor plates are spaced and joined by the conventional strap 96 (Fig. 2), but in the present case the strap is arranged at an angle and within the general outline of the plate. In effect, the rotor assembly is beveled. The stator plates are matingly beveled at 98. I find that this construction minimizes loss of plate area, while obtaining best utilization and least waste of metal when punching the plates from a continuous sheet of material. For convenience, I may refer to the angle or bevel relative to the straight sides of plates generally defined by a straight and a curved edge, but obviously no limitation as to the exact or detailed shapes of the plates is intended.

It is believed that the mode of constructing and using, as well as the many advantages of my improved condenser construction, will be apparent from the foregoing detailed description thereof. The condenser is provided with trimmer plates which are readily applied to or removed from the condenser without in any way loosening the mounting of the stator in the condenser frame. The trimmer condenser may thus be shifted from one side of the frame to the other without upsetting the accurate location of the stator within the frame. The trimmer plate is held in place in a simplified manner, the plate and comb having integrally formed mating parts which permit the use of a single mounting screw. The trimmer plate is provided with a soldering lug so formed thereon as to dispense with the use of additional metal and to eliminate all extra scrap or waste metal. Soldering lugs may be provided at the side of the condenser opposite the trimmer condensers, and such lugs may be mounted in place in a simplified manner dispensing entirely with mounting screws, if desired.

It will be apparent that while I have shown and described my invention in preferred form, many changes and modifications may be made in the structure disclosed, without departing from the spirit of the invention, defined in the following claims.

I claim:

1. A variable condenser comprising a frame supporting a rotor, a plurality of stator plates and combs connecting the edges thereof to form a stator assembly, means mounting the stator in place within the frame, a trimmer plate, and means detachably mounting the trimmer plate on the stator comb independently of the means supporting the stator in the frame, said means including a part of the trimmer plate mating with a part of the adjacent stator comb.

2. A variable condenser comprising a frame supporting a rotor, a plurality of stator plates and combs connecting the edges thereof to form a stator assembly, means mounting the stator in place within the frame, and a readily detachable trimmer plate including a part received within and mating with a part of the comb, and a single screw for locking the trimmer plate to the comb, said stator being supported independently of said screw.

3. A variable condenser comprising a frame supporting a rotor, a plurality of stator plates and combs connecting the edges thereof to form a stator assembly, insulation support means secured to said comb and to said frame for mounting the stator in place within the frame, and a readily detachable trimmer plate including a part received within and mating with a part of the comb, and a single screw for locking the trimmer plate to the comb, said stator being supported independently of said screw.

4. A variable condenser comprising a frame, a rotor supported thereby, a plurality of stator plates and combs connecting the edges thereof to form a stator assembly, each comb being formed of sheet metal shaped and bent to form an upper strap, a lower strap, and a channel portion therebetween, a block of insulation secured to the channel portion, means securing said blocks to the frame in order to hold the stator in place, a readily detachable trimmer plate including a stationary portion and an adjustable portion, said stationary portion and said comb having mating means for supporting the trimmer plate independently of the stator support.

5. A variable condenser comprising a frame, a rotor supported thereby, a plurality of stator plates and combs connecting the edges thereof to form a stator assembly, each comb being formed of sheet metal shaped and bent to form an upper strap, a lower strap, and a channel portion therebetween, a block of insulation secured to the channel portion, means securing said blocks to the frame in order to hold the stator in place, a trimmer plate including a fixed lower portion and an adjustable upper portion, said lower portion including a bottom tongue received within a lip pressed outwardly from the channel portion of the comb, and a single screw passing through the bottom portion of said trimmer plate and into the comb.

6. A variable condenser comprising a frame, a rotor supported thereby, a plurality of stator plates and combs connecting the edges thereof to form a stator assembly, each comb being formed of sheet metal and shaped and bent to form an upper strap, a lower strap, and a channel portion therebetween, a block of insulation received within and secured to the channel portion, means securing said blocks to the frame in order to hold the stator in place, a readily detachable trimmer plate including a fixed lower portion and an adjustable upper portion, said lower portion including a bottom tongue received within a lip pressed outwardly from the channel portion of the comb, and a single screw passing through the bottom portion of said trimmer plate and into the comb, the stator mounting being independent of said screw.

7. A variable condenser comprising a frame, a rotor supported thereby, a plurality of stator plates and combs connecting the edges thereof to form a stator assembly, each comb being formed of sheet metal shaped and bent to form an upper strap, a lower strap, and an outwardly bent channel-shaped portion therebetween, a T-shaped block of insulation the upper bar of which is received within the channel and the stem of which passes downwardly through the bottom wall of the channel, means permanently locking the comb and insulation block together, means securing said insulation blocks to the frame in order to hold the stator in place, a readily detachable trimmer plate including a stationary portion and an adjustable portion, said stationary portion including a tongue received within a slot formed on the comb, and a fastener passing through the stationary portion of said trimmer plate and into the comb.

8. A variable condenser comprising a frame, a rotor supported thereby, a plurality of stator plates and combs connecting the edges thereof to form a stator assembly, each comb being formed of sheet metal shaped and bent to form an upper strap, a lower strap extending in a direction parallel to the upper strap but lying in an angularly related plane, and an outwardly bent channel-shaped portion between said straps, a T-shaped block of insulation the upper bar of which is received within the channel and the stem of which passes downwardly through the bottom wall of the channel, rivets permanently locking the comb and insulation block together, means securing said insulation blocks to the frame in order to hold the stator permanently in place, a readily detachable trimmer plate including a fixed lower portion and an adjustable upper portion, said lower portion including a bottom tongue received within a lip pressed outwardly from the channel portion of the comb, a single screw passing through the bottom portion of said trimmer plate and into the comb, said comb being extruded inwardly and threaded to receive the screw.

9. A variable condenser comprising a frame, a rotor supported thereby, a plurality of stator plates and combs connecting the edges thereof to form a stator assembly, means mounting the stator in place within the frame, a soldering lug, and integrally formed mating means on said comb and lug for holding the lug on the comb.

10. A variable condenser comprising a frame, a rotor supported thereby, a plurality of stator plates and combs connecting the edges thereof to form a stator assembly, each comb being formed of sheet metal shaped and bent to form an upper strap, a lower strap, and a channel portion therebetween, a block of insulation secured to the channel portion and to the frame in order to hold the stator in place, a soldering lug comprising a body portion and an outwardly projecting lug, said body portion and said comb having integral mating means for holding the lug on the comb.

11. A variable condenser comprising a frame, a rotor supported thereby, a plurality of stator plates and combs connecting the edges thereof to form a stator assembly, each comb being formed of sheet metal shaped and bent to form an upper strap, a lower strap, and a channel portion therebetween, a block of insulation secured to the channel portion, means securing the blocks to the frame in order to hold the stator in place, a soldering lug comprising a body portion and an outwardly projecting lug formed integrally therewith, said body portion including a tongue adapted to be received within a slot formed on the comb, and an inwardly struck tab adapted to be received within a hole formed in the comb.

12. A variable condenser comprising a frame, a rotor supported thereby, a plurality of stator plates and combs connecting the edges thereof to form a stator assembly, each comb being formed of sheet metal shaped and bent to form an upper strap, a lower strap extending in a direction parallel to the upper strap but lying in an angularly related plane, and an outwardly bent channel-shaped portion between said straps, a T-shaped block of insulation the upper bar of which is received within the channel and the stem of which passes downwardly through the bottom wall of the channel, rivets permanently locking the comb and insulation block together, means securing said insulation blocks to the frame in order to hold the stator permanently in place, a detachable soldering lug comprising a body portion and an outwardly projecting lug formed intgerally therewith, the lower edge of said body portion being formed into a tongue adapted to be received within an outwardly pressed lip formed on the comb, the upper part of said body portion being struck inwardly to form a tab adapted to be received within a threaded hole formed in the comb, said lug being locked in place between the lip and thread by the opposed tongue and tab.

13. A spacer and support member or comb for a variable condenser, said comb comprising a piece of sheet metal shaped and bent to form an upper holding portion or strap, a lower holding portion or strap, an outwardly bent channel portion interconnecting said lower and upper straps, the channel portion being longitudinally slotted adjacent the straps to provide slight yieldability of the straps.

SAMUEL COHEN.